United States Patent
Rao et al.

(10) Patent No.: US 6,269,246 B1
(45) Date of Patent: *Jul. 31, 2001

(54) LOCATION DETERMINATION USING RF FINGERPRINTING

(75) Inventors: Padmanabha R. Rao, Milpitas; Paolo L. Siccardo, Los Altos, both of CA (US)

(73) Assignee: PPM, Inc., Los Altos Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,296

(22) Filed: Sep. 22, 1998

(51) Int. Cl.$^7$ ........................................... H04Q 7/20
(52) U.S. Cl. ........................................ 455/456; 455/186.1
(58) Field of Search .................... 455/410, 440, 455/456, 454, 186.1, FOR 100; 342/457

(56) References Cited

U.S. PATENT DOCUMENTS

| | | |
|---|---|---|
| 4,907,290 | 3/1990 | Crompton . |
| 5,230,081 | 7/1993 | Yamada et al. . |
| 5,293,642 | 3/1994 | Lo . |
| 5,293,645 | 3/1994 | Sood . |
| 5,327,144 | 7/1994 | Stilp et al. ........................... 342/387 |
| 5,355,526 * | 10/1994 | Berninger ........................... 455/186.1 |
| 5,390,234 | 2/1995 | Bar-Noy et al. . |
| 5,423,067 | 6/1995 | Manabe . |
| 5,442,684 | 8/1995 | Hashimoto et al. . |
| 5,461,365 | 10/1995 | Schlager et al. ...................... 340/573 |
| 5,493,286 * | 2/1996 | Grube et al. ........................... 455/456 |
| 5,508,707 | 4/1996 | LeBlanc et al. ...................... 342/457 |
| 5,513,243 | 4/1996 | Kage . |
| 5,524,136 | 6/1996 | Bar-Noy et al. . |
| 5,539,924 | 7/1996 | Grube et al. . |
| 5,548,816 | 8/1996 | DeVaney . |
| 5,552,795 | 9/1996 | Tayloe et al. ........................ 342/357 |

(List continued on next page.)

FOREIGN PATENT DOCUMENTS

02044929 * 2/1990 (JP) ............................. 455/FOR 100

OTHER PUBLICATIONS

Gaspard, Ingo et al., "Position assignment in digital cellular mobile radio networks (e.g. GSM) derived from measurements at the protocol interface," *IEEE* (O–7803–3659–3/97) (1997), pp. 592–596.

Hellebrandt, Martin et al., "Estimating position and velocity of mobiles in a cellular radio network," *IEEE Translations on Vehicular Technology*, 46(1) Feb. 1997, pp. 65–71.

Jimenez, J. et al., "Mobile location using coverage information: Theoretical analysis and results," *European Cooperation in the Field of Scientific and Technical Research* (Euro–Cost) 043 (Apr. 1999), pp. 1–9.

Koshima, Hiroaki et al., "Personal locator services emerge," *IEEE Spectrum* Feb. 2000, pp. 41–48.

\* cited by examiner

Primary Examiner—Marsha D. Banks-Harold
(74) Attorney, Agent, or Firm—Townsend and Townsend and Crew LLP

(57) ABSTRACT

The location of a mobile unit (MU) in a wireless communication system is determined by comparing a snapshot of a predefined portion of the radio-frequency (RF) spectrum taken by the MU to a reference database containing multiple snapshots taken at various locations. The result of the comparison is used to determine if the MU is at a specific location. The comparison may be made in the MU, or at some other location situated remotely from the MU. In the latter case, sufficient information regarding the captured fingerprint is transmitted from the MU to the remote location. The database may be pre-compiled or generated on the fly.

19 Claims, 5 Drawing Sheets

U.S. PATENT DOCUMENTS

| | | |
|---|---|---|
| 5,570,412 | 10/1996 | LeBlanc . |
| 5,592,180 | 1/1997 | Yokev et al. .................... 342/450 |
| 5,596,330 | 1/1997 | Yokev et al. .................... 342/387 |
| 5,600,706 | 2/1997 | Dunn et al. . |
| 5,602,903 | 2/1997 | LeBlanc et al. . |
| 5,650,770 | 7/1997 | Schlager et al. ................ 340/573 |
| 5,657,487 | 8/1997 | Doner ............................. 455/456 |
| 5,666,662 | 9/1997 | Shibuya .......................... 455/456 |
| 5,675,344 | 10/1997 | Tong et al. ..................... 342/457 |
| 5,732,354 | 3/1998 | MacDonald .................... 455/456 |
| 5,736,964 | 4/1998 | Ghosh et al. ................... 342/457 |
| 5,758,288 | 5/1998 | Dunn et al. ..................... 455/456 |
| 5,787,354 | 7/1998 | Gray et al. ...................... 455/456 |
| 5,802,473 | 9/1998 | Rutledge et al. ................ 455/441 |
| 5,926,765 * | 7/1999 | Sasaki ............................. 455/456 |
| 5,974,330 * | 10/1999 | Negishi ........................... 455/456 |

| Fingerprint Structure | | | | |
|---|---|---|---|---|
| Time of Capture: | | | | |
| Station ID: | I1 | I2 | I3 | ... | In |
| Frequency: | F1 | F2 | F3 | ... | Fn |
| Tuning Parameters: | P1 | P2 | P3 | ... | Pn |
| Transmitter Location: | L1 | L2 | L3 | ... | Ln |
| Signal Strength 1: | S11 | S12 | S13 | ... | S1n |
| Signal Strength 2: | S21 | S22 | S23 | ... | S2n |
| ... | ... | ... | ... | ... | ... |
| Signal Strength m: | SSm1 | SSm2 | SSm3 | ... | SSmn |

FIG. 4

| No. | Lat | Long | Time | Fingerprint | Description |
|---|---|---|---|---|---|
| 1 | | | | | |
| 2 | | | | | |
| 3 | | | | | |
| 4 | | | | | |
| 5 | | | | | |
| 6 | | | | | |
| ... | | | | | |
| L | | | | | |

Fingerprint Database 501

FIG. 5

LOCATION DETERMINATION USING RF FINGERPRINTING

BACKGROUND OF THE INVENTION

The present invention relates generally to telecommunications, and more specifically to wireless messaging systems.

In connection with mobile communication systems, it is becoming increasingly important to determine the location of the communicating Mobile Unit (MU). Various systems for locating are already well known. One solution that is readily available in most modern cellular systems is to use the ID of the cell from which the MU is communicating. Typically, this information is accurate to a resolution of several miles. A second solution is to compute the location of the MU based on the cellular network signaling parameters (angle of arrival, time delay of arrival, signal strength, etc.). This information is typically accurate to several tens of meters. Yet another solution is to equip the MU with a GPS receiver which then attempts to track the location of the MU as accurately as possible. Typically, GPS receivers can compute locations to within several tens of meters of accuracy. When combined with differential corrections, the accuracy can be improved to less than 10 meters with a high degree of probability.

As far as reliability is concerned the cell ID information is the most reliable, and is guaranteed to be available as long as the cellular network is functioning normally. The network signal based location computations are less reliable, since they are dependent on several conditions being true at the time of the call. For example, most schemes require the MU to have line-of-sight visibility to multiple cellular base stations. This is not always possible. GPS based location computation is also not always reliable since the MU may be in an environment where there is no penetration of the GPS satellite signals.

SUMMARY OF THE INVENTION

The present invention provides a method for determining the location of a mobile unit in a wireless communication system and presenting it to a remote party.

According to one aspect of the invention location of a remote MU is determined by comparing a snapshot of a predefined portion of the radio-frequency (RF) spectrum taken by the MU to a reference database containing multiple snapshots taken at various locations. The result of the comparison is used to determine if the MU is at a specific location. The comparison may be made in the MU, or at some other location situated remotely from the MU. In the latter case, sufficient information regarding the captured fingerprint is transmitted from the MU to the remote location. The database may be pre-compiled or generated on the fly.

A further understanding of the nature and advantages of the present invention may be realized by reference to the remaining portions of the specification and the drawings.

BRIEF DESCRIPTION OF THE DRAWINGS

FIG. 4 is an illustration of the organization of the fingerprint data; and

FIG. 5 is an illustration of the organization of the fingerprint database.

DESCRIPTION OF SPECIFIC EMBODIMENTS

The present invention provides a new method for determining the location estimate of a Mobile Unit (MU) in a wireless communication network.

Figure 1:
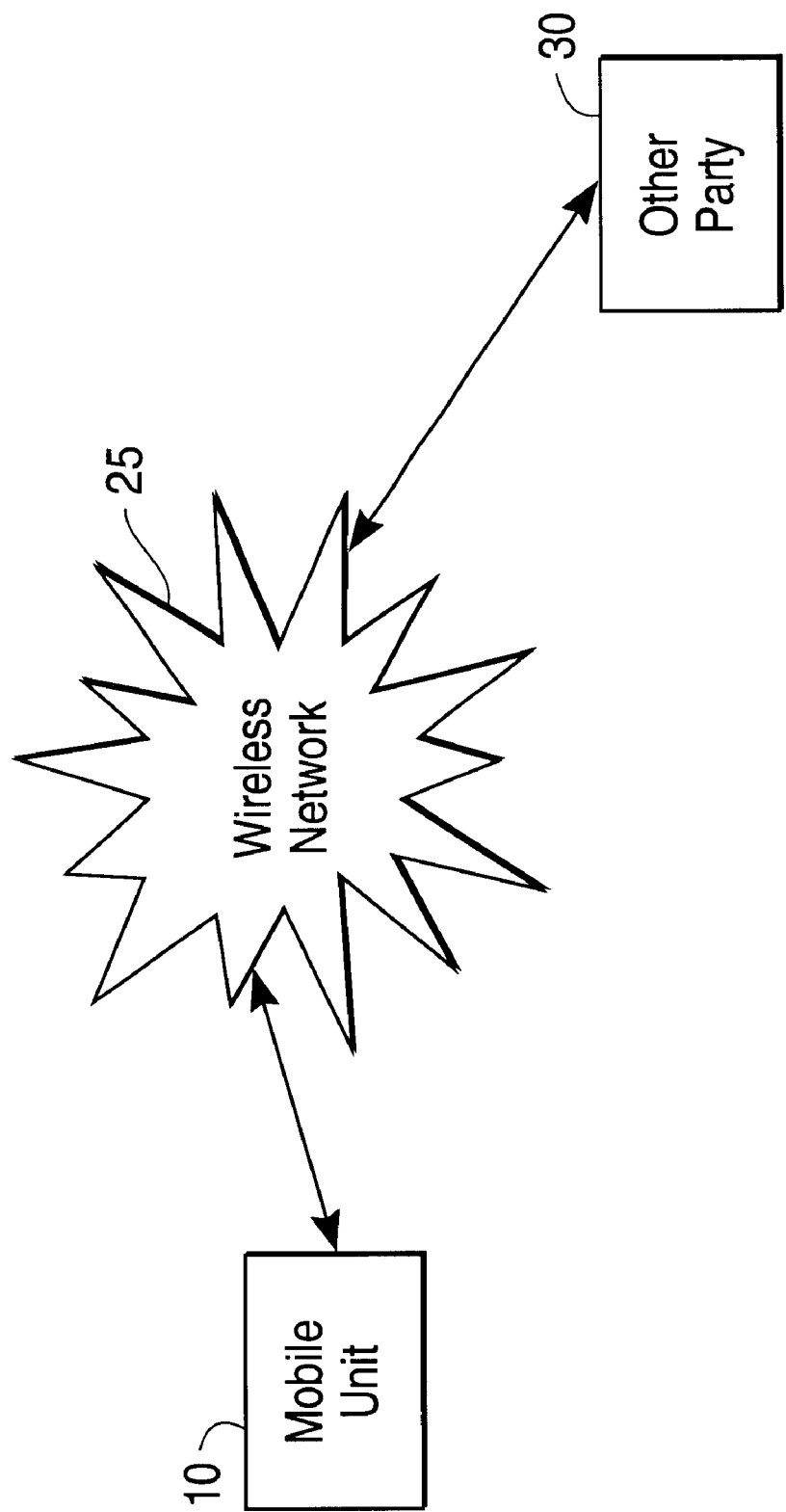
FIG. 1 shows a representative wireless communication system.

FIG. 1 is a high level block diagram of a wireless communication network. A Mobile Unit 10 has a connection with a wireless network 15, which in turn is connected to an Other Party 30. The Other Party may or may not be mobile. The location of the MU is of interest to the Other Party for several reasons such as provisioning of prompt and efficient personalized services, dispatching emergency assistance personnel, tracking the movements of the MU, etc.

There are several different methods for determining the location of MU 10, as is known to one skilled in the art. For example, the MU could be equipped with a GPS receiver. Alternatively, the wireless network could be equipped to determine the location of MU 10. For example, the network could monitor the time of arrival of signals from the MU at various nodes and from that information determine its location. Again, such techniques are well known to one skilled in the art.

All of the prior art techniques have significant disadvantages. For example, it is well known that GPS receivers do not work very well in urban canyons and indoor locations where signal strength is very low. The network based schemes such as TDOA and AOA (both well known prior art) are disadvantaged in that they need significant infrastructural modifications.

The present invention provides a new method for determining the location of MU 10 which (a) works in areas where GPS coverage is not typically available, and (b) does not require any infrastructural modifications. Thus, the present invention complements existing location determining technologies and, when used in conjunction with them, augments their performance.

The invention is based on the principle that any location has a unique Radio Frequency (RF) spectral fingerprint. Spectral fingerprint in this context is defined as a predetermined combination of observable RF spectral parameters. For instance, observed signal strength of a predetermined set of signals in the RF spectrum constitutes a fingerprint. Today, worldwide, practically the entire RF spectrum, up to 2 GHz and above, is being utilized by several different applications. The signal characteristics vary greatly across this spectrum, however, for any given location, it is possible to pre-select a portion of the spectrum and a combination of signal parameters in the pre-selected band that will be unique to that location.

In accordance with the invention MU 10 is equipped with circuitry and software that is capable of capturing information from predetermined portions of the RF spectrum. In one embodiment the predetermined portions of the RF spectrum all fall within or in close proximity to the same band as that utilized by the wireless communication network. In such an instance the same hardware circuitry can be used for performing both functions. In another embodiment the predetermined portions of the RF spectrum are different from the wireless communication band and in such an instance additional circuitry is required. For example, the MU may use signal characteristics from the television UHF band, in which case it will require a television tuner capable of capturing the appropriate television channels. In another example the MU is equipped with a tuner designed to capture AM or FM radio broadcasts. In this case the MU is equipped with a radio capable of tuning to the appropriate radio broadcasting bands.

Figure 2:
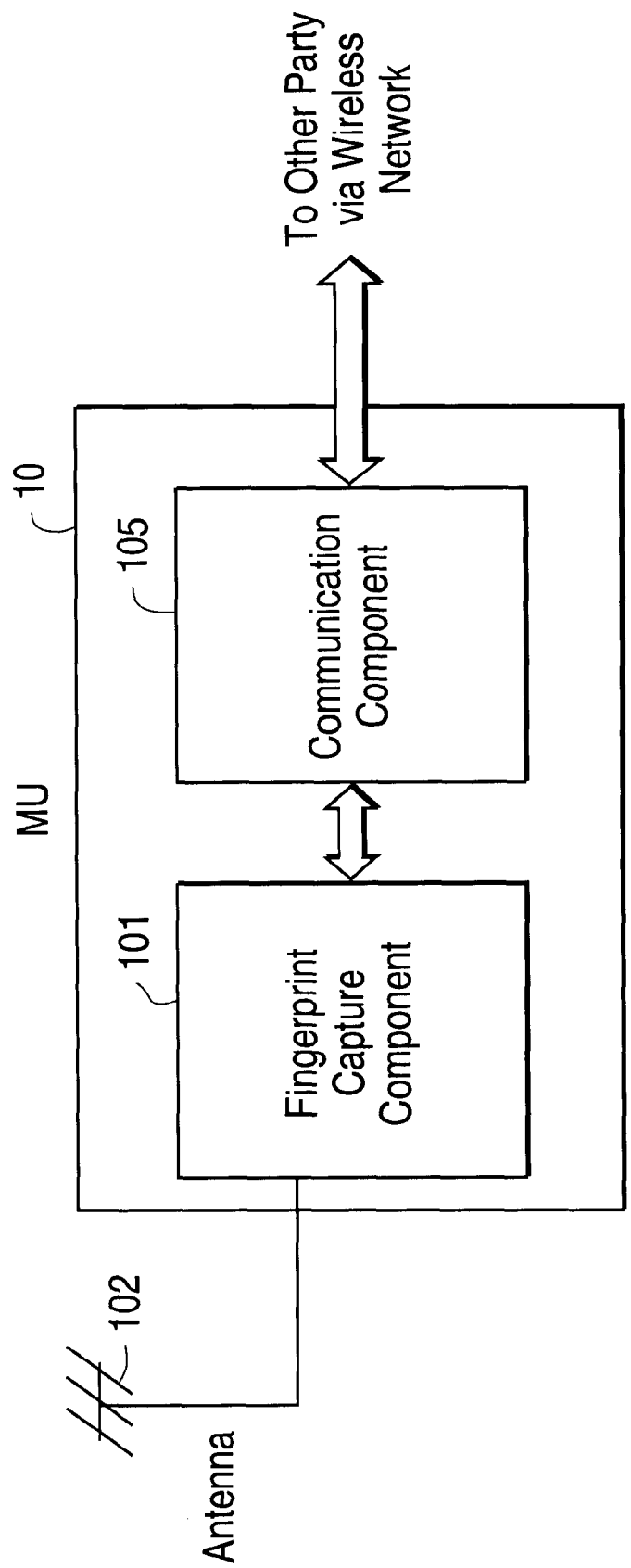
FIG. 2 is a high level diagram of the Mobile Unit.

FIG. 2 shows the MU containing a component 101 for tuning to a predetermined portion of the RF spectrum. Also included is a communication component 105 for communicating information with the Other Party over an existing wireless infrastructure. Component 101 obtains information from the RF spectrum via an Antenna 102.

In many instances, Other Party 30 is interested in only determining if MU 10 is at a particular location or not. The resolution of knowing the MU's location is not high (e.g., several meters), but much coarser, such as of the order of several tens of meters. For example, Other Party 30 may be interested in knowing if MU 10 is inside a particular building, or a campus or a block. In such cases it is not necessary to provide very high-resolution information to Other Party 30.

There are other instances where Other Party 30 is desirous of knowing the accurate location of MU 10, however, is incapable of doing so. This could be because other location determining capabilities in the system, such as GPS, are not functional at the instant when the location information is desired. This is typical when the MU is in an area where GPS signals are not available, such as inside a building. The location determining method described in this invention is capable of operating in areas where GPS and other location technologies are not.

When a location estimate of the MU is desired (either by itself or by the Other Party), it activates component 101 (FIG. 2), which captures predetermined information from a predetermined portion of the RF spectrum. Instructions regarding what information to capture and the portion of the RF spectrum from which to capture may be either pre-programmed in the MU, or generated in real time. In the latter case, it may be generated in the MU, or downloaded into the MU from the Other Party over the wireless network. The MU may capture multiple pieces of information or from multiple portions of the spectrum.

The spectral fingerprint may be generated using many different parameters, either individually or in combination. In one embodiment, signal strength is used. In another embodiment, phase information is used. In another embodiment, the identity of the received signals (e.g., frequency) is used. In yet another embodiment the identity of the signal source (e.g., channel number or station code) is used. In yet another embodiment, the geographic locations of the transmitters from which the signals originate are used.

The MU is equipped with the appropriate circuitry and software to capture the required signals and their parameters. In one embodiment the MU has an antenna that is designed to have a bandwidth spanning a large portion of the VHF and UHF spectrum, e.g., from 70 MHz to 1 GHz. In another embodiment, the MU has an antenna that is designed to capture only a narrowband of the spectrum. Such an antenna may be cheaper to implement and unobtrusive. In one embodiment the MU is equipped with appropriate circuitry to determine the strength of the received signal. In one instance the location of the transmitter is broadcast in the signal and is extracted in the MU.

In one embodiment, the MU is instructed by the Other Party to scan selected portions of the spectrum and capture selected parameters from the received signals. The Other Party determines which portions of the spectrum to scan and what parameters to capture based on other information it has received or generated regarding the MU. For example, in one instance the Other Party knows the approximate location of the MU by receiving identity of the (wireless communication network) cell that the MU is in at that time. By looking up a database the Other Party can determine the geographic location of the cell. The Other Party then determines which signals in the vicinity of said cell are most suitable for generating a fingerprint. For example, certain television signals may have better coverage of the cell than other signals. The Other Party then transmits this information (e.g., television channel numbers) to the MU via the wireless link requesting it to scan only those selected signals.

In another embodiment of the invention, the MU determines which portion of the spectrum to scan, and what parameters to use for generating the fingerprint.

After the MU captures the appropriate signals and extracts the parameters, it has the basic information for generating the fingerprint. Some preprocessing may be required to refine the raw data. For example, signal strengths may have to be lower and upper limited to eliminate very weak and very strong signals.

Once the fingerprint is generated, its association with a certain location has to be determined. According to this invention this is done by utilizing a fingerprint database that contains a number of fingerprints along with their corresponding location identities. In one embodiment the database is stored in the MU. The generated fingerprint is compared with the fingerprints in the database and the fingerprint in the database that is closest to the generated fingerprint is selected as the match. The corresponding location in the database is then chosen as the location of the MU. In one embodiment of the invention, the search algorithm takes more than one fingerprint from the database that are closest to the generated fingerprint and interpolates the most plausible location for the MU from the locations of the chosen fingerprints.

In another embodiment the fingerprint database is stored at the Other Party and the generated fingerprint (in the MU) is transmitted to the Other Party over the wireless link. The search for the closest fingerprint is then done in the Other Party from which it determines the location of the MU.

Figure 3:
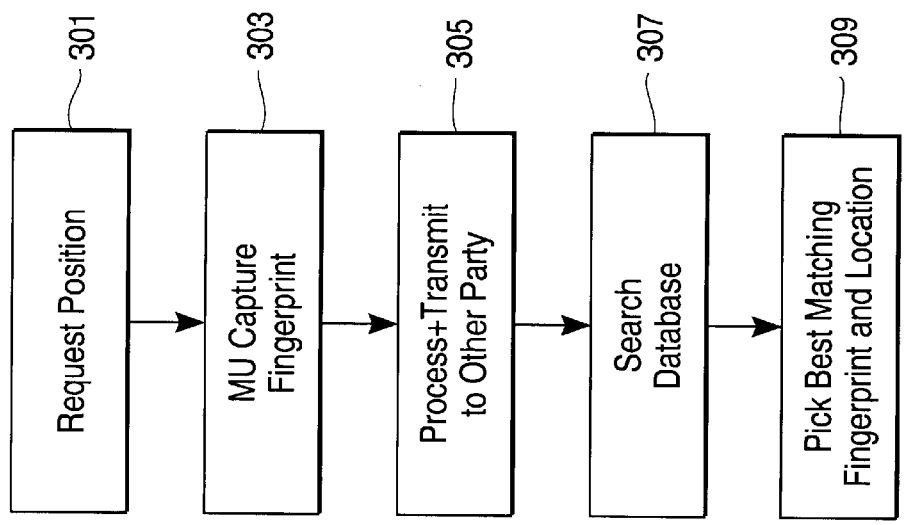
FIG. 3 is a flow diagram of the position determining process employed by this invention.

FIG. 3 depicts the flow of events in this case. A request for position of the MU is generated, as shown in box 301. The request may be generated by the user carrying the MU, or remotely by the Other Party. On receipt of the request the MU captures the fingerprint of its current location (box 303). The captured fingerprint is processed appropriately. Processing may include filtering the fingerprint data and reformatting it to reduce its storage space. Subsequently the fingerprint is transmitted over the wireless link to the Other Party as shown in box 305. The Other Party has a database into which it executes a search for the closest matching fingerprint, as shown in box 307. Box 309 shows the process culminating in the retrieval of the best matching fingerprint along with its corresponding location. In one embodiment the search also returns a confidence measure that depicts the closeness of the match.

According to one aspect of this invention the fingerprint database is designed to take into account any dynamic, but predetermined, variations in the RF signal characteristics. For example, it is not uncommon that some AM radio broadcast stations lower their transmitter power at night to minimize interference with other stations. In some countries this is mandated by law. If signal strength is one of the parameters used for generating the fingerprint then it is essential that that dynamic change in transmitted power be taken into consideration before any decision is made. According to this aspect of the invention the fingerprint database and the decision algorithms are designed to accommodate such dynamic changes. Since the change pattern in signal characteristics is predetermined, the database is constructed by capturing the fingerprints at different times so as to cover all the different patterns in the transmitted signals. The time at which a fingerprint was captured is also stored along with its location identity.

There are many choices for the search algorithm that is required to determine the closest matching fingerprint, as can be appreciated by one skilled in the art of statistical pattern matching. Specifically, the choice of the algorithm is a function of what parameters are used to generate the fingerprints. In one instance the search algorithm chooses the fingerprint from the database that has the smallest mathematical distance between itself and the captured fingerprint. The mathematical distance is defined as a norm between the two data sets. For example, it could be the average squared difference between the two fingerprints. There are many different ways to define "closeness" between two fingerprints; again, this is dependent on the signal parameters used to generate the fingerprints. In one embodiment the search algorithm also has built in heuristics that make the best possible decision in case none of the fingerprints in the database matches well with the generated fingerprint.

The complexity of the search can be greatly reduced if an approximate estimate of the MU's location is already available. For example, if the identity of the cell in which the MU is located is known, then according to this invention, the search algorithm will limit its search to only those fingerprints that correspond to locations contained within said cell.

Similarly, the search complexity is reduced by noting the time at which the location information is requested. As previously mentioned, not all fingerprints in the database are valid for all times in the day. Knowing the time at which the request is received, the database engine limits the search to the appropriate fingerprints.

FIG. 4 illustrates a structure 400 of the fingerprint in one embodiment of this invention. As mentioned previously there are several possible methods for defining the fingerprint. FIG. 4 is but an example. The time at which the fingerprint is captured is stored in the fingerprint structure, as shown by box 401. In one embodiment the UTC format is used to store time. There are several fields in the structure, some of which are optionally filled by the MU. Some other fields are optionally filled by the Other Party. It is not necessary that all fields be filled since the necessary fields can be predetermined based on system parameters.

The fingerprint comprises characteristics of received signals at multiple frequencies. Each column in FIG. 4 is information pertaining to a particular frequency or carrier. A Station ID field 403 indicates the unique identifying code of a broadcasting station from which the signal emanated. This field is optional. In one embodiment this field is filled by the MU using information received in the signal. In another embodiment 45 this field is filled by the Other Party to indicate to the MU as to which signals to capture for the fingerprint. A Frequency field 405 is the unique frequency value at which a signal is captured. Either the Station ID field or the Frequency field is mandatory since without both it is not possible to identify the signal. A Tuning Parameter field 407 is used when the MU requires additional information to tune to a particular carrier. In one embodiment this field is supplied by the Other Party with information containing the modulation characteristics of the signal. This field is optional. In one embodiment a Transmitter Location field 409 is used to characterize the received signals. In another embodiment this field is filled by the Other Party. The MU may optionally use this information to determine if it wants to capture the signal emanating from a particular transmitter. Finally, Signal Strength fields 411, 413, are filled by the MU based on the signal strengths of the received carriers. In one embodiment the signal strength is sampled multiple times for each frequency in order to smooth out any variations. At least one of the Signal Strength fields is required to be filled by the MU.

FIG. 5 shows the high level structure of the fingerprint database 501 in one embodiment. As one skilled in the art can appreciate, there are many methods for building, managing and searching databases. The purpose of FIG. 5 is merely to illustrate the structure of the database in one embodiment. Each row in database 501 corresponds to one fingerprint. The Lat and Long fields indicate the latitude and longitude of the location to which the fingerprint corresponds. In one instance the fingerprint corresponds not to one exact spot on the surface of the earth, but instead to a small area. The Lat and Long fields in this embodiment indicate a position inside the area, preferably the center point. The Time column indicates the time at which the fingerprint was captured. In one embodiment the UTC time format is used to indicate this time. The Fingerprint column contains the actual fingerprint data. In one embodiment the structure depicted in FIG. 4 is used to store the fingerprint data. Finally, the Description column contains a short description of the location corresponding to the fingerprint. For example, it may indicate a street address, or an intersection. This field is optional.

Generation of the fingerprint database is another aspect of this invention. In one embodiment the database is built by taking off-line snapshots of fingerprints at various locations. The fingerprint information along with the coordinates of the location are entered into the database. The more the locations, the richer the database. The resolution of location determination is also controlled by how far apart the fingerprint samples are taken. The closer they are, the higher the resolution. Of course, a person skilled in the art can appreciate that the resolution of the database is limited by the sensitivity of the fingerprint measuring device. In one embodiment the fingerprints are taken using very sensitive signal measuring devices that enable locations that are very close to each other to have distinct fingerprints.

In another embodiment the database is built by taking fingerprint measurements at predetermined locations and using intelligent algorithms that interpolate the fingerprints at all locations in between the sampled locations. This method has the advantage of not requiring a great many physical measurements to be made, however, it does suffer from some loss in accuracy. This is because, however clever, the interpolating algorithms will not be as accurate as making the actual measurements.

In yet another embodiment the database is generated on the fly using smart algorithms that can predict the fingerprints in a local area. This scheme is effective in instances where an approximate idea of the MU is already available. For example, this could be the cell in which the MU is.

Conclusion

In conclusion, it can be seen that this invention has two significant improvements over prior art location techniques. One, it can be be implemented without requiring any modifications to existing This invention has two significant improvements utilized in areas where GPS coverage is not available. This is because the fingerprints are generated by using portions of the RF spectrum that typically have superior coverage and in-building penetration than GPS signals. Second, it can infrastructure.

While the above is a complete description of specific embodiments of the invention, various modifications, alternative constructions, and equivalents may be used. Therefore, the above description should not be taken as limiting the scope of the invention as defined by the claims.

What is claimed is:

1. A method for locating the position of a mobile unit in a wireless communication network, said method comprising the following steps:

capturing a first fingerprint of the RF spectrum in the mobile unit and storing therewith a time of capture;

comparing said first fingerprint with a multiplicity of fingerprints, each of said multiplicity of fingerprints having an associated location, wherein said multiplicity of fingerprints is designed, by including for at least some fingerprints of said multiplicity of fingerprints respective indications of time of capture to take into account a dynamic, but predetermined, change in signal power as a function of time for some signal frequencies in the RF spectrum;

selecting a second fingerprint from said multiplicity of fingerprints as the closest matching fingerprint to said first fingerprint, wherein said closest matching fingerprint is selected based on the combination of said indications of time of capture for said multiplicity of fingerprints and said time of capture for said first fingerprint so as to account for said dynamic, but predetermined change in signal power as a function of time for some signal frequencies in the RF spectrum; and assigning a location corresponding to said second fingerprint to said mobile unit.

2. The method of claim 1 wherein said first and second fingerprints are generated using a predetermined portion of the RF spectrum.

3. The method of claim 2 wherein said predetermined portion of the RF spectrum overlaps with the portion of the RF spectrum utilized by the wireless communication network.

4. The method of claim 2 wherein said predetermined portion of the RF spectrum overlaps with the portion of the spectrum utilized by commercial FM radio broadcasting stations.

5. The method of claim 1 wherein said first and second fingerprints are generated using a predetermined set of signal parameters.

6. The method of claim 1 wherein said multiplicity of fingerprints is stored in the mobile unit.

7. The method of claim 6 wherein said location assignment is performed by the mobile unit.

8. The method of claim 1 wherein said multiplicity of fingerprints is stored in an Other Party that is linked to the mobile unit via the wireless communication network.

9. The method of claim 8 wherein said first fingerprint is processed and transmitted over the wireless communication network to the Other Party.

10. The method of claim 9 wherein said location assignment is performed by the Other Party.

11. A method for locating the position of a mobile unit in a wireless communication network, said method comprising the following steps:

capturing a first fingerprint of the RF spectrum in the mobile unit and storing therewith a time of capture;

comparing said first fingerprint with a fingerprint database, each entry in said fingerprint database having an associated location, wherein said fingerprint database is designed, by including for at least some of the entries in the fingerprint database respective indications of time of capture to take into account a dynamic, but predetermined, change in signal power as a function of time for at least some signal frequencies in the RF spectrum;

selecting a second fingerprint from said fingerprint database as the closest matching fingerprint to said first fingerprint, wherein said closest matching fingerprint is selected based on the combination of said indications of time of capture for each entry stored in said fingerprint database and said time of capture for said first fingerprint so as to account for said dynamic, but predetermined change in signal power as a function of time for at least some signal frequencies in the RF spectrum; and assigning a location corresponding to said second fingerprint to said mobile unit.

12. The method of claim 11 wherein said first and second fingerprints are generated using a predetermined portion of the RF spectrum.

13. The method of claim 11 wherein said multiplicity of fingerprints is stored in the mobile unit.

14. The method of claim 13 wherein said location assignment is preformed by the mobiled unit.

15. The method of claim 11 wherein said multiplicity of fingerprints is stored in an Other Party that is linked to the mobile unit via the wireless communication network.

16. The method of claim 15 wherein said first fingerprint is processed and transmitted over the wireless communication network to the Other Party.

17. The method of claim 16 wherein said location assignment is performed by the Other Party.

18. The method of claim 11 wherein said predetermined portion of the RF spectrum overlaps with the portion of the RF spectrum utilized by the wireless communication network.

19. The method of claim 11 wherein said predetermined portion of the RF spectrum overlap with the portion of the spectrum utilized commercial FM radio broadcasting stations.

* * * * *